Feb. 5, 1963   M. P. SIENA   3,076,660
COLLET
Filed Sept. 21, 1961

*INVENTOR.*
MICHAEL P. SIENA
BY *Frank C. Parker*
*David E. Dougherty*
ATTORNEYS

3,076,660
COLLET
Michael P. Siena, Rochester, N.Y., assignor to Bausch & Lomb Incorporated, Rochester, N.Y., a corporation of New York
Filed Sept. 21, 1961, Ser. No. 139,808
4 Claims. (Cl. 279—2)

The present invention relates to a novel expansion collet and more particularly to a novel collet having an opening extending longitudinally through the center thereof.

The fabrication, assembly and testing of optical elements often requires precision alignment with respect to an optical axis. In order to align such elements it is desirable to grip the element in a manner which facilitates such alignment. Alignment with respect to an optical axis requires an open ray path in the area of the optical axis, therefore, the usual draw rod which passes through the center of a collet should be replaced by a hollow member.

The present invention contemplates replacing a conventional draw rod in a collet with a novel cam arrangement. The novel cam arrangement allows for an opening which extends longitudinally through the collet to facilitate alignment procedures during fabrication, assembly or testing of optical elements. A system of this type may be combined with an autocollimator or a reticle system for alignment purposes.

Briefly, the present invention contemplates a novel expansion collet having an opening extending longitudinally through the center thereof. A hollow cylindrical member is inserted into a tubular housing. The cylindrical member includes means for obtaining relative axial movement within the tubular housing, and a plurality of jaws. The jaws are separated by longitudinally extending slots which terminate in run out holes. The cylindrical member includes a cam follower which is cooperable with a cone shaped cam surface fixed to or integral with the tubular housing for opening or closing the device. The hollow opening extending through the cylindrical member allows for the optical alignment of an element during the fabrication, assembly or testing of the element with respect to its optical axis.

In the preferred embodiment the run-out holes are positioned relatively close to a threaded portion on the cylindrical member and the tubular housing has an internal thread adapted to receive the threaded portion of the cylindrical member. The cylindrical member also includes a shoulder which acts as a stop to limit the forward travel of the cylindrical member within the tubular housing.

The preferred embodiment includes a band of resilient material such as a rubber ring or spring which is forced over the cylindrical member to force the jaws of the collet inwardly against the mechanical advantage of the cam arrangement. Therefore the jaws have a tendency toward an open position i.e. a position which would release an internally gripped element.

The invention will now be described in connection with the accompanying drawing in which, FIG. 1 is an exploded perspective view partly broken away and cross sectioned of a novel collet according to the present invention;

Figure 1:
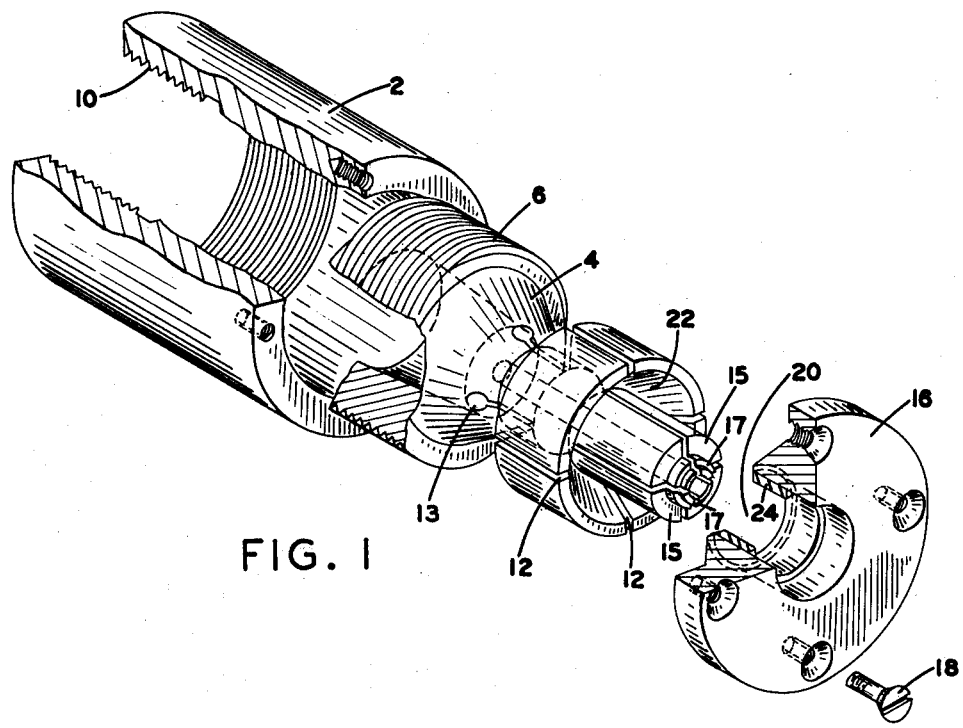
Figure 2:
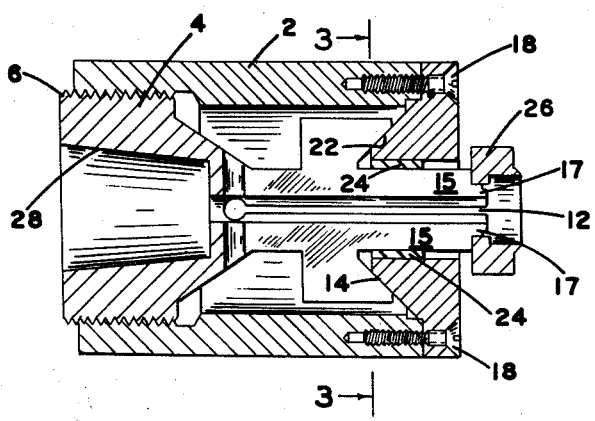
FIG. 2 is a mid-sectional view of the collet shown in FIG. 1.
Figure 3:
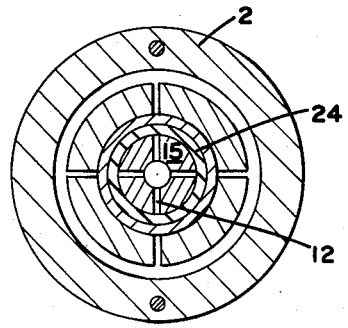
FIG. 3 is a cross sectional view taken along the lines 3—3 in FIG. 2.

A collet according to the present invention has a tubular housing 2 and a hollow cylindrical member 4. The cylindrical member 4 has an externally threaded portion 6 at one end thereof. The threaded portion is adapted to fit into a corresponding internally threaded portion 10 of the housing 2. This arrangement allows for the forward or rearward movement of the cylindrical member 4 within the housing 2.

A plurality of longitudinal slots 12 extend along the hollow cylindrical member 4. The slots 12 extend from one end opposite from the threaded portion 6 inwardly toward the threaded portion 6 and terminate in run out holes 13. The run out holes 13 are formed in the hollow cylindrical member 4 and are located relatively close to the threaded portion 6. The slots 12 separate the spring arms 15 which include the jaws 17 at the open ends thereof.

A cam surface 14 is fixed to or integral with an end plate 16. The end plate 16 is fixed to one end of the housing 2 by screws 18. The cam surface 14 has a shape generally similar to the frustum of a cone.

An opening 20 extends through the center of the frustum and end plate. The opening is of sufficient size for the spring arms 15 and jaws 17 to pass through in an expanded position. Generally the cam surface 14 is machined as an integral part of the end plate 16, however in some cases it may be desirable to machine the surface 14 as an integral part of the housing 2 or as a separate member which may be fixed to the housing or plate.

A second cam surface or follower 22, forms an integral part of the cylindrical member. The cam surface 22 is located between the jaws and run out holes 13. The cam surface 22 is generally similar to a frustum of a cone and is adapted to be cooperable with the cam surface 14.

The longitudinal slots extend through the cam surface and form radial passages extending from the outer periphery of the frustum to the opening extending through the center of the cylindrical member. The frustum shaped cam surface is separated into segments. Each arm carries a cam segment.

A resilient ring 24 such as a band of rubber is forced over the cylindrical member 4 and arms 15. The ring is smaller in diameter than the cylindrical member and forces the arms 15 inwardly toward one another. Generally the ring 24 is located between the cam segments and the jaws 17. In some cases it may be desirable to substitute a metal spring for the band of rubber in order to increase the inwardly directed force on the spring arms.

A workpiece 26 is clamped in the device by placing the jaws 17 into an inner ring surface and turning the cylindrical member 4 in the housing 2. This causes the member 4 to move in a forward direction. This movement causes the cone shaped cam follower 22 to ride upwardly on the cone shaped cam 14. The rubber bushing or sleeve 24 tends to force the collet into a release position. The inward force exerted by the rubber bushing is overcome by the mechanical advantage obtained by screwing the member 4 into the outer housing 2. As the cylindrical member 4 is turned to move the member 4 outwardly the resilient ring 24 is effective to force the collet into a release position i.e. by forcing the arms 15 inwardly toward one another to thereby release the workpiece 26.

It is contemplated that the cylindrical member 4 may include means for adapting the collet to be received by a standard lathe collet, by substituting a shank end for the tapered portion 28. Similarly the portion 28 may be replaced by a threaded portion which would fit a standard spindle nose thread.

What is claimed is:

1. A collet having a tubular housing, a cylindrical member, and means defining a longitudinal opening extending through said cylindrical member, said tubular housing having an opening extending therethrough and means defining a frusto conical cam surface, said cylindrical member having a segmented portion and a cam follower on each of the segments of said segmented portion, and means for obtaining relative axial movement within said tubular housing, said segmented portion including a set of jaws adapted to grip an internal surface of a workpiece whereby the axial movement of said cylindrical member within said tubular housing is effective to open or close said jaws.

2. A collet according to claim 1 which includes a constrictive resilient ring engaging the periphery of the segmented portion of the cylindrical member and said ring being adapted to force the segments of the segmented portion inwardly toward each other.

3. A collet having a tubular housing, a cylindrical member and means for defining a longitudinal opening extending through said cylindrical member, said tubular housing having an opening extending therethrough and an internal thread at one end thereof, and said cylindrical member having an external thread corresponding to the internal thread on said housing whereby relative axial movement is effected by turning said cylindrical member with respect to said tubular housing; said cylindrical member having a segmented portion at the end opposite the external thread and a segmented frusto conical cam surface intermediate of said external thread and the open end of said segmented portion, said segmented portion and said segmented cam surface defining a plurality of longitudinally extending slots, and said segmented portion including a set of jaws adapted to grip the interior surface of a hollow workpiece, a resilient ring engaging the periphery of said segmented portion to thereby force the jaws of the collet inwardly toward each other, and said tubular member having a frusto conical cam surface adapted to cooperate with said segmented frusto conical cam surface for expanding the segments and said jaws of said cylindrical member whereby the axial movement of said cylindrical member within said tubular housing is effective to open or close said jaws.

4. A collet according to claim 3 in which said resilient ring is made of rubber and in which an end plate including a frusto conical cam surface is fixed to the tubular housing, said end plate including means defining an opening extending through the center of the frusto conical cam to allow the jaws of the collet to pass therethrough in their expanded position.

References Cited in the file of this patent

UNITED STATES PATENTS

| | | |
|---|---|---|
| 2,949,313 | Moser | Aug. 16, 1960 |
| 2,966,361 | Phillips | Dec. 27, 1960 |